United States Patent [19]

Usher

[11] Patent Number: 4,516,782
[45] Date of Patent: May 14, 1985

[54] METHOD OF PRODUCING HIGH TEMPERATURE COMPOSITE SEAL

[75] Inventor: Peter P. Usher, Union, N.J.

[73] Assignee: Metex Corporation, Edison, N.J.

[21] Appl. No.: 527,247

[22] Filed: Aug. 29, 1983

Related U.S. Application Data

[62] Division of Ser. No. 856,174, Nov. 30, 1977.

[51] Int. Cl.³ .................. F16J 15/12; B32B 31/06
[52] U.S. Cl. ........................................ 277/1; 277/30;
277/204; 277/230; 277/233; 277/DIG. 6;
285/412; 285/DIG. 11; 264/258; 264/324;
264/512; 264/516
[58] Field of Search ............... 277/1, 12, 30, 47, 48,
277/101, 102, 105, 106, 204, 229, 230, 233, 234,
235 R, 235 A, 235 B, 236, 188 R, 188 A, DIG.
6; 285/187, 363, 368, 405, 412, DIG. 11, DIG.
18; 29/520; 264/103, 248, 257, 258, 268, 273,
324, 501, 502, 512, 516, 563

[56] References Cited

U.S. PATENT DOCUMENTS

| 2,398,210 | 4/1946 | Cumming et al. | 277/230 X |
| 2,400,533 | 5/1946 | Buffington | 277/188 R X |
| 2,676,823 | 4/1954 | Olson et al. | 264/324 X |
| 2,924,471 | 2/1960 | Poltorak et al. | 277/230 X |
| 3,044,922 | 7/1962 | Kappel | 264/324 X |
| 3,404,061 | 10/1968 | Shane et al. | 277/DIG. 6 X |

FOREIGN PATENT DOCUMENTS 972650 10/1964 United Kingdom ............... 277/230

Primary Examiner—Robert S. Ward

[57] ABSTRACT

A high temperature seal, particularly suitable for use in vehicle engine exhaust systems, formed of a composite structure including refractory sheet material and wire mesh. In a typical application, the seal is disposed between confronting ends of an engine exhaust manifold pipe and an exhaust tail pipe, and permits relative rotation of the pipes without impairment of the effectiveness of the seal, thereby preventing leakage of high temperature exhaust gases passing through the joined pipes.

3 Claims, 5 Drawing Figures

U.S. Patent  May 14, 1985  4,516,782
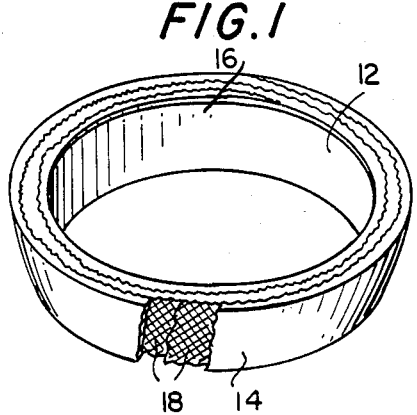
FIG. 1
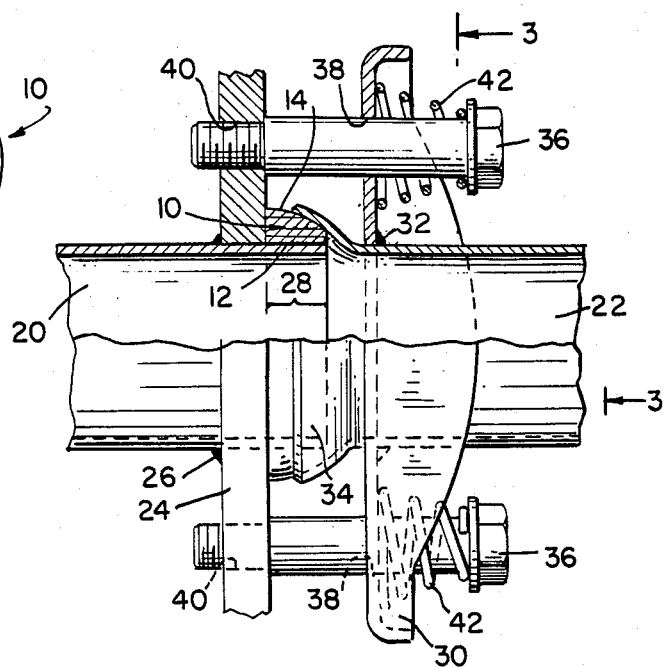
FIG. 2
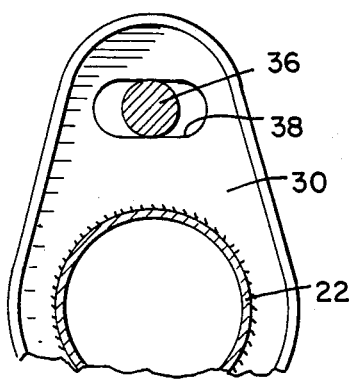
FIG. 3
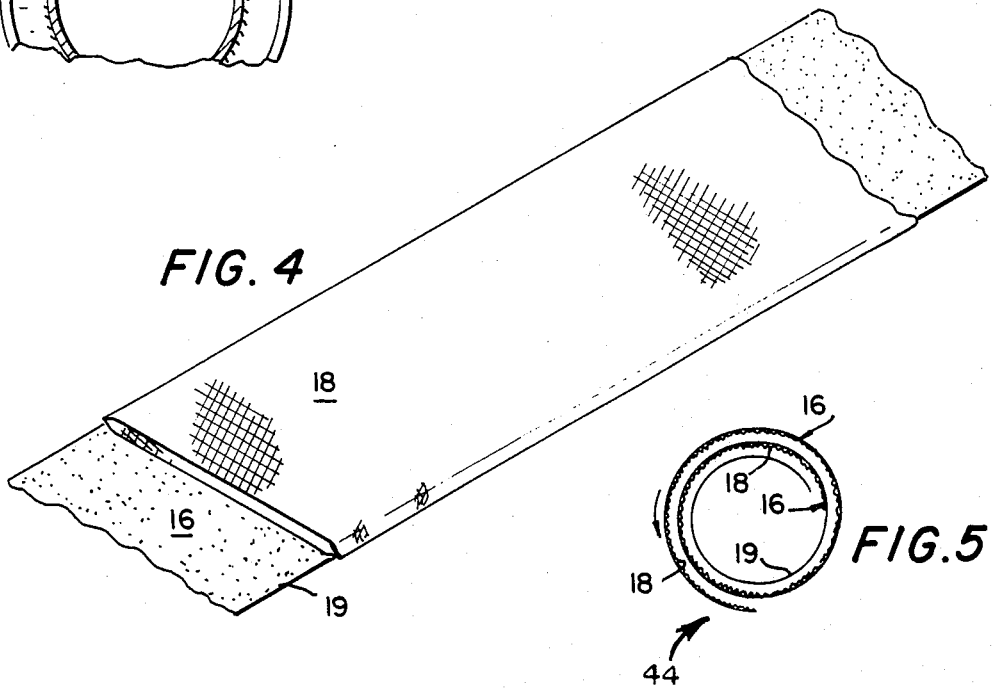
FIG. 4
FIG. 5

2

METHOD OF PRODUCING HIGH TEMPERATURE COMPOSITE SEAL

This is a division of application Ser. No. 856,174, filed Nov. 30, 1977.

This invention relates generally to high temperature exhaust seals and, more particularly, to a composite seal including flexible refractory sheet material and wire mesh, the seal being especially useful in vehicle exhaust systems.

There are two general approaches to mounting a vehicle engine. In one approach, the engine is mounted so that its crankshaft runs longitudinally with respect to the vehicle body (hereinafter referred to as a longitudinally mounted engine). In the other approach, the engine is mounted so that its crankshaft runs transversely with respect to the vehicle body (hereinafter referred to as a transversely mounted engine). The latter arrangement is particularly useful for front wheel driven vehicles.

With regard to the exhaust systems appurtenant to these engines, it will be apparent that a particular exhaust system, which includes an engine exhaust manifold and tail pipe, will vary in its configuration depending upon the engine mounting orientation with respect to the vehicle, i.e., longitudinal or transverse.

For example, in the case of a longitudinally mounted engine, an exhaust manifold pipe extends from the engine exhaust manifold down alongside of the engine, and usually has a flange joined at its opened end which faces downward for connection to a mating flange on a tail pipe running beneath the vehicle. With this configuration, a seal is usually disposed between the connected flanges for preventing exhaust gas leakage out around the joined flanges. Movement of the exhaust manifold, such as caused by normal operation of the engine, is fully communicated to the tail pipe by way of the joined flanges. Stresses caused by the tail pipe movement are absorbed by flexible mountings (also known as hangers) which secure the tail pipe to the underside of the vehicle body. The typical exhaust seals therefore need not absorb any of these stresses and, because of this, they are of relatively simple construction. A typical seal used in longitudinally mounted engine applications is made of cast iron, and has tapered bearing surfaces which cooperate with the surfaces of the flanges to effect a tight seal. Other seals for these applications employ a laminate construction including asbestos and perforated sheet steel. Still other conventional seals may include impregnated asbestos yarn knitted within a wire mesh, these materials being pressed together to form the seal. In some instances, no seal is used at all, the flanges themselves effecting a sealed joint when connected together.

Transversely mounted engines, however, present a more difficult problem. Usually, the exhaust manifold pipe extends downward alongside the engine and has a flange at its opened end which also faces generally downward. However, normal engine operating movement resulting from rotational momentum of the crankshaft and opposing torsional forces of the driveshaft causes the exhaust manifold pipe flange to reciprocate in such a manner that the central axis of the pipe, which is perpendicular to the plane of the flange, departs from a substantially vertical line and becomes inclined alternately towards the front and rear of the vehicle. It is necessary to use a flexible joint between the exhaust manifold and the tail pipe to absorb this movement; otherwise it will be communicated directly to the tail pipe causing intolerable stresses and strains. Such stresses and strains can cause metal fatigue and accelerates failure of the tail pipe. Excessive noise can also be generated by vibrations induced by the stress reversals.

It will therefore be understood that with a transversely mounted engine, the exhaust seal in the flexible joint must be capable of permitting a degree of relative rotation between the exhaust manifold and tail pipes and still maintain an effective exhaust gas seal. Exhaust seals which are useful with longitudinally mounted engines are undersirable for use in vehicles having transversely mounted engines, because they cannot withstand the relative rotative movement and stress encountered in the flexible exhaust joints uded with the latter. An attempt to overcome this problem has been to include a section of corrugated pipe between the exhaust manifold and the tail pipe in the hopes that the corrugated section could absorb the relative rotative movement and stresses produced therebetween. In practice, this solution has not proved successful since the corrugated pipe frequently fractures as a result of mechanical fatigue under high temperature operating conditions.

Another solution to overcome the problem of providing a sealed exhaust joint which tolerates some relative pipe movement is a "ball and socket" type joint such as, for example, that shown in U.S. Pat. No. 3,188,115, issued June 8, 1965. The joint discloses in the patent, however, is not satisfactory for permitting relative rotative movement of one of the joined pipes, since bolts which pass through unslotted openings in the joint pressure plate will cause both pipes to rotate in unison.

Another exhaust seal, for use in a flexible exhaust joint adapted to allow for relative rotative pipe movement, includes graphite sheet material surrounding perforated sheet metal. That seal has proven unsatisfactory in meeting the severe operating requirements of the flexible joint. In particular, the seal lacked structural integrity and under normal operating stress its composite layers of graphite and sheet metal would separate from one another causing failure of the seal.

The present invention provides an exhaust seal capable of meeting the rigorous operating requirements imposed by a flexible exhaust joint, is particularly suitable for use in transversely mounted engine exhaust systems, and can be effectively used therein as well as in many other applications which will be suggested to one skilled in the art upon reading of the disclosure herein.

An exhaust seal according to the present invention includes wire mesh having openings between the wires thereof, and flexible refractory sheet material surrounding the wires and substantially filling the openings in the wire mesh.

In a preferred embodiment, the present invention provides an exhaust seal formed of flexible refractory material in sheet form which is pressed through the openings of the wire mesh after it is convoluted thereover.

An important advantage of the exhaust seal according to the present invention is its unusually high resiliency which makes it particularly suitable for use in flexible exhaust joints which connect exhaust manifold and tail pipes together in vehicles having transversely mounted engines. This resiliency allows the seal to abosrb a high degree of rotative stress when positioned within the flexible joint. Additionally, due in part to a relatively high amount of lubricity on its bearing surface, the present seal permits relative rotative movement of the pipe which engages its bearing surface, and still maintains an effective seal against exhaust gases passing through both of the joined pipes.

The seal of the present invention is preferably produced by constructing a cylindrical preform which includes refractory material in flexible sheet form and wire mesh, and axially compressing the preform with a predetermined force to thereby form the finished product.

Other advantages and applications for the exhaust seal of the present invention will be apparent upon a reading of the following detailed description thereof with reference to the accompanying drawings.

In the drawings:

FIG. 1 is a perspective partially broken view of an exhaust seal according to the present invention showing the refractory material and wire mesh therein;

FIG. 2 is a side elevational view, fragmented and partially in section, showing the present exhaust seal disposed in operative position between an exhaust manifold and tail pipe of an automobile;

FIG. 3 is a view taken along line 3—3 of FIG. 2;

FIG. 4 is a perspective view of a layer of wire mesh and a layer of refractory sheet material positioned together prior to forming the seal by a method of the present invention; and, FIG. 5 is a top view of a preform configuration for the wire mesh and refractory material of FIG. 4.

Referring now to the drawings, and in detail with respect to FIG. 1 thereof, an exhaust seal according to the present invention is designated generally by numeral 10. The seal 10 is preferably in an endless ring form as shown, and has an inner radial surface 12 and an outer radial surface 14. The surfaces 12 and 14 are formed to sealingly engage confronting surfaces on pipes and flanges to be joined to one another, respectively, an example of such a joint being shown and described later with regard to FIG. 2.

The present exhaust seal 10 is preferably formed of flexible sheet material 16 and knitted wire mesh 18. The refractory material 16 and the mesh 18 are preferably pressed together to form the seal 10, it being desired and preferred to have the refractory material 16 present on both of the inner and outer radial surfaces 12 and 14, respectively, as shown in FIG. 1. It is also desired and preferred that the refractory material substantially fill the openings in the mesh 18 and all other air voids within the seal 10.

In further detail, a refractory material which is especially suitable for the seal 10 is graphite in flexible sheet form. For example, automotive grade GTC graphite sheet material as may be obtained from Union Carbide Corporation, New York, N.Y., has been found to perform satisfactorily. Of course, other similar or higher grade flexible graphite sheet material from other sources maybe used as well in the present exhaust seal. A preferred thickness range is 0.010 to 0.050 inches.

Another refractory material 16 which may be used in the present seal 10 is flexible bonded mica sheet. An example of a suitable mica material is silicone bonded mica paper such as No. 22-50-25 obtainable from Midwest Mica and Insulation Company, Cleveland, Ohio. Other flexible mica material, such as organic bonded mica sheet is also usable in the present invention.

The wire mesh 18 is preferably made of steel, but other materials having comparable strength and resiliency could be used as well. The mesh wire may have a diameter in the range of about 0.0035 inches (0.089 mm.) to 0.011 inches (0.279 mm.) and the openings between adjacent wires in the mesh is preferably in the range of about 0.125 inches (3.18 mm.) to 0.250 inches (6.35 mm.).

In accordance with the present invention, and referring to FIGS 4 and 5, exhaust seal 10 is maufactured by convoluting a strip of refractory material 16 with one or more overlying pieces of knitted wire mesh 18 to form a generally cylindrical preform 44. The length of the mesh piece or pieces 18 is arranged to suit the finished size of the seal 10, and it is preferred that the mesh length correspond to two or more circumferential lengths of the finished seal 10. The width of the mesh 18 is also chosen to suit each seal design, this width being preferably at least two or more times the height of the finished seal.

The refractory sheet material 16 is prepared by cutting it to form a strip of appropriate length and width. The length of strip 16 depends on the desired dimensions of the finished seal 10, and is preferably equal to or longer than that of the wire mesh 18. In the event refractory strip 16 is longer than the mesh piece 18, an offset 19 of the refractory strip 16 is arranged to appear at one end of the overlying layers as shown in FIG. 4. The width of the strip 16 is preferably equal to that of the wire mesh 18, but it can be slightly narrower or wider than the mesh 18 depending upon whether or not it is desired to have some of the mesh 18 present on the end surfaces of the finished seal 10.

The preform 44 is then loaded into a conventional compression die (unshown) which has a cavity shaped substantially the same size as that of the finished seal 10. The die is designed in such a manner that compression force is applied axially to the preform 44. After inserting preform 44 into the die, an axial load is applied of sufficient force to cause the preform 44 to collapse to the size and shape of the finished seal 10.

During the pressing operation, the refractory sheet and the wire mesh become firmly interlocked to provide a high degree of mechanical stability and structural integrity to the seal 10.

An exhaust seal including flexible graphite sheet, having a finished height of about 0.5 inches (1.27 cm.) and an inner diameter of about 2.0 inches (5.08 cm.) as represented by FIG. 1 can be manufactured as follows.

A double layer strip of knitted steel wire mesh, about 15.75 inches (40.005 cm.) in length and 2.125 inches (5.398 cm.) in width is prepared by flattening and cutting a wire mesh sleeve. The diamter of the mesh wire is preferably about 0.011 inches (0.279 mm.). The openings between adjacent mesh wires preferably extend from about 0.125 inches (3.18 mm.) to 0.250 inches (6.35 mm.). The prepared strip of wire mesh is then degreased as by dipping in a solution or by other conventional means.

A 0.015 inch thick flexible graphite sheet, such as GTC auotmotive grade as may be obtained from Union Carbide Corporation, New York, N.Y., is prepared by cutting it to form a strip measuring about 24.500 inches (62.23 cm.) in length by about 2.188 inches (5.56 cm.) wide.

The degreased steel mesh strip 18 (FIG. 4) is laid over the prepared graphite sheet strip 16 so that one end of the mesh 18 coincides with a corresponding end of the graphite strip 16 (these ends not appearing in FIG. 4). The layers thus oriented are preferably fastened together at several locations as by staples, so that they are retained in the above-defined relationship with respect to one another. It will be understood that one end of the graphite sheet 16 will be offset, as at 19, from the end of the mesh 18 as shown in FIG. 4.

The fastened layers 16, 18 are wrapped about a cylindrical mandril, beginning with the offset end 19 of graphite sheet material 16, and continuing with the wire mesh layer 18 facing towards the mandril (unshown) during the wrapping step. When wrapping is completed, preform 44 (FIG. 5) is thereby formed. Preform 44 is itself preferably stapled through all of its layers or otherwise conventionally secured to retain its shape. For example, an end of preform 44 may be partially removed from the mandril and stapled through the removed end, and thereafter completely removed and stapled through its other end.

The preform 44 is then loaded into a suitable hand die and axially compressed, preferably with a 50 to 75 ton load. The finished seal is then removed upon disassembly of the die.

An exhaust seal according to the present invention, as represented by FIG. 1, including a mica sheet refractory material can be manufactured in a manner similar to that used to produce the graphite laminate seal as described above. For example, a mica laminate seal, having a finished inner diameter of about 2.0 inches (5.08 cm.) and a height of about 0.67 inches (1.70 cm.) is manufactured as follows.

A double layer strip of knitted stainless steel wire mesh, about 22.500 inches (57.15 cm.) long by 2.75 inches (6.985 cm.) wide is prepared by flattening and cutting a wire mesh sleeve of type 309 stainless steel wire. The wire diameter is preferably 0.011 inches (0.279 mm.) The openings between adjacent mesh wires preferably extend from about 0.125 inches (3.18 mm.) to 0.250 inches (6.35 mm.). The prepared mesh strip is then conventionally degreased.

A silicone bonded mica paper, such as No. 22-05-25 obtainable from Midwest Mica and Insulation Company, Cleveland, Ohio, is prepared by cutting it in the form of a strip having a length of about 30 inches (76.2 cm.) and a width of about 2.875 inches (7.30 cm.).

The prepared wire mesh is then overlaid on the mica paper strip so that one end of the paper extends out from a corresponding end of the mesh by a distance of about 6.625 inches (16.828 cm.). The two layers are then stapled together, preferably at two locations near the offset end.

The stapled layers are then wrapped around a cylindrical mandril, beginning with the offset end of the mica sheet, the wire mesh facing towards the mandril during this wrapping step. When wrapping is completed to define a preform, the preform is retained in shape as by a rubber band secured therearound. The preform is then removed from the mandril and loaded into a suitable die which has preferably been sprayed with a standard dry-type silicone mold release. Finally, the preform is axially compressed under a load of approximately 50 to 75 tons. After compression is relaxed, the finished seal is mechanically ejected from the die.

Both of the seals produced as described above exhibit unusual resiliency characteristics and a degree of lubricity on their bearing surfaces making them especially well suited for tolerating rotative pipe movement on their bearing surfaces.

Referring to FIG. 2, the seal 10 of the present invention is shown positioned in a "bull and socket" type joint of the kind intended for use in exhaust systems of transversely mounted automobile engines. The joint is made between confronting ends of pipes 20 and 22, the pipe 20 defining a port for an exhaust manifold (unshown) and the pipe 22 being an automobile exhaust tail pipe which is usually secured underneath the auto as by unshown flexible clamping means.

It will be understood that during engine operation, the pipe 20 will undergo rotative movement relative to tail pipe 22 such as described earlier. Seal 10 is strong enough to withstand the stresses produced by relative movement while providing a seal which prevents exhaust gaas leakage.

In the typical joint configuration of FIGS. 2 and 3, the exhaust manifold pipe 20 has a flange 24 securely joined thereto in the vicinity of its open end as by weld 26, for example. A portion 28 of pipe 20 is allowed to extend forwardly of flange 24 for a distance sufficient to allow the seal 10 to be inserted thereover, as shown in FIG. 2. It will be appreciated that the inner radial surface 12 of the seal 10 is preferably in substantial contacting relationship with the outer surface of the forward pipe portion 28, thereby requiring that the inner diameter of the seal 10 be substantially equal to the outside diameter of the exhaust manifold pipe 20.

Exhaust tail pipe 22 has a flange 30 securely joined thereto near its open end, the flange 30 being welded at 32 to pipe 22, for example. Extending forwardly of flange 30 is an outwardly flared section 34 of tail pipe 22, the inside surface of the flared section 34 being preferably arcuately formed as is the outer bearing surface 14 of seal 10, so that the seal bearing surface 14 defines the "ball" and the flared section inside surface forms the "socket" of the joint. The section 34 may also be conically tapered so as to maintain a line contact seal against the outer seal surface 14. The seal of the present invention will therefore perform satisfactorily when bearing against a conically tapered pipe surface, as well as against a complimentarily shaped arcuate pipe surface as shown in FIG. 2.

The opening defined by flared portion 34 is of an extent sufficient to overextend the forward pipe portion 28, thereby permitting the present seal 10 to be disposed between the confronting ends of the pipes 20 and 22, respectively. It will be appreciated that the seal 10 is mounted to sealingly engage the outer surface of forward pipe portion 28 and the inner surface of the flared portion 34 when these pipe portions are urged towards one another as explained below.

A pair of bolts 36 extend through corresponding openings 38 in flange 30. Significantly, the openings 38 are slotted as shown in FIG. 3 so as to provide for rocking movement of the bolts 36, this movement being caused by the movement of manifold pipe 20 during engine operation. Bolts 36 threadingly engage corresponding threaded openings 40 to provide through flange 24 on manifold pipe 20. It will therefore be understood that as the manifold pipe 20 is caused to rotate relative to tail pipe 22, the bolts 36 will be free to rock back and forth within the slots 38.

The bolts 36 urge the flange 30 towards flange 24 by way of compression springs 42 disposed between the heads of bolts 36 and the opposed surface of flange 30. It will be apparent that the above-mentioned sidewise movement of bolts 36 will not be appreciably restrained by the springs 42 when using the configuration of FIGS. 2 and 3.

With the seal 10 in the position shown in FIG. 2, it will also be apparent that it is restrained from relative axial movement due to its abutment on one side against the flange 24, and the abutment of its outer radial bearing surface 18 in sealing relationship with the inside of the flared pipe portion 34. However, the seal 10 tolerates relative rotative movement between the confronting surfaces of the pipes 20 and 22 as by permitting movement of the tail pipe flared portion 34 over its bearing surface 14. Seal 10 can also absorb an unusually high degree of stress resulting from such movement, and still maintain an effective seal.

While the foregoing description has been primarily directed to applications of the seal 10 in which relative rotative movement and stress must be tolerated by the seal during operating conditions, it will be understood that the seal of the present invention may be effectively used in other applications, not only in the automotive field, but in many others, such as marine and aviation, for example.

Modifications and variations of the present seal and its method of manufacture will be apparent to one skilled in the art. It is therefore intended that all such equivalent methods and materials be included within the scope of the appended claims which define the present invention.

What is claimed is:

1. A method of producing substantially coherent high temperature exhaust seal adapted to sealingly engage confronting surfaces on pipes and flanges to be joined to one another to form a flexible joint comprising the steps of constructing a generally cylindrical preform by convoluting a strip of flexible refractory sheet material with one or more overlaying pieces of flexbile knitted wire mesh said wire mesh being formed of wire and having voids of given size between said wires, disposing said preform in a compression die, said die having a cavity size and shape which is substantially the same as the desired exhaust seal, and applying an axial load to said preform, said load being of sufficient force to collapse said preform to substantially the size and shape of said exhaust seal and to cause said refractory material to substantially fill the openings in said wire mesh and substantially all other air voids within said exhaust seal and to become firmly interlocked with said wire mesh.

2. The method of claim 1 wherein the length of wire mesh corresponds to two or more circumferential lengths of the finished seal.

3. The method of claim 1 wherein the width of the mesh is two or more times the height of the finished seal.

* * * * *

UNITED STATES PATENT AND TRADEMARK OFFICE
CERTIFICATE OF CORRECTION

PATENT NO.    :   4,516,782
DATED         :   May 14, 1985
INVENTOR(S)   :   PETER USHER

It is certified that error appears in the above—identified patent and that said Letters Patent is hereby corrected as shown below:

```
        Column 2, line 29 delete "discloses"
                          insert -- disclosed --

Column 5, line 67 delete "bull"
                          insert -- ball --

Column 6, line 55 delete "to provide"
                          insert -- provided --

Column 8, line 1 after "producing"
                          insert -- a --
```

Signed and Sealed this

Fifteenth    Day of    October 1985

[SEAL]

Attest:

DONALD J. QUIGG

Attesting Officer

Commissioner of Patents and
Trademarks—Designate